United States Patent
Wu et al.

(10) Patent No.: US 9,194,739 B2
(45) Date of Patent: Nov. 24, 2015

(54) METHOD FOR MEASURING MECHANICAL RESONANCE FREQUENCY USING SERVO DRIVER

(71) Applicants: ESTUN AUTOMATION TECHNOLOGY CO., LTD, Nanjing, Jiangsu (CN); NANJING ESTUN AUTOMATION CO., LTD, Nanjing, Jiangsu (CN)

(72) Inventors: Bo Wu, Nanjing (CN); Kaifeng Yang, Nanjing (CN); Dandan Qi, Nanjing (CN)

(73) Assignees: Nanjing Estun Automation, Co. LTD, Nanjing, Jiangsu (CN); Estun Automation Technology Co. LTD, Nanjing, Jiangsu (CN)

( * ) Notice: Subject to any disclaimer, the term of this patent is extended or adjusted under 35 U.S.C. 154(b) by 258 days.

(21) Appl. No.: 14/116,442

(22) PCT Filed: Feb. 28, 2013

(86) PCT No.: PCT/CN2013/071999
§ 371 (c)(1),
(2) Date: Nov. 8, 2013

(87) PCT Pub. No.: WO2013/135138
PCT Pub. Date: Sep. 19, 2013

(65) Prior Publication Data
US 2014/0123757 A1 May 8, 2014

(30) Foreign Application Priority Data
Mar. 14, 2012 (CN) .......................... 2012 1 0065420

(51) Int. Cl.
*G01H 13/00* (2006.01)
(52) U.S. Cl.
CPC ...................................... *G01H 13/00* (2013.01)
(58) Field of Classification Search
CPC ....................................................... G01H 13/00
USPC ............................................................ 73/579
See application file for complete search history.

(56) References Cited

U.S. PATENT DOCUMENTS 3,512,425 A * 5/1970 Yoshiaki .............. G05B 19/232
74/388 PS
4,041,783 A 8/1977 Shimauchi et al.
(Continued)

FOREIGN PATENT DOCUMENTS

| CN | 201788018 U | 4/2011 |
| CN | 102147285 A | 8/2011 |

(Continued)

OTHER PUBLICATIONS

Detection and Reduction of Middle frequency resonance for industrial Servo with self tuning low pass filter, Wen Yu Wang and An-WEn Shen, May 8, 2012, Journal of Control Science and Engineering, vol. 2012, Article ID 478907, 12 pages.*

(Continued)

*Primary Examiner* — J M Saint Surin
(74) *Attorney, Agent, or Firm* — Hudak, Shunk & Farine Co. LPA

(57) ABSTRACT

A method of measuring mechanical resonance frequency using a servo driver including the steps of: having the servo driver work under a torque control mode, by applying in the servo driver a preset torque drive signal, the motor drives the mechanical components in a microvibration state; collecting actual speed signals of the motor to obtain the actual speed signal sequence of the motor; the actual speed signal sequence of the motor being passed in sequence through a certain number of band-pass filters having a fixed pass-band frequency and different center frequencies to obtain filtered speed signals; the filtered speed signal sequences output from each of the band-pass filters being changed into absolute values and then accumulated to obtain accumulation values; comparing the accumulation values obtained from the signal sequences output from the certain number of band-pass filters, and the center frequency of the band-pass filter corresponding to the largest accumulation value being the mechanical resonance frequency. By using the method, an automatic measurement of the mechanical resonance frequency of a mechanical device can be achieved.

1 Claim, 3 Drawing Sheets

(56) References Cited

U.S. PATENT DOCUMENTS

| | | | | |
|---|---|---|---|---|
| 5,424,960 | A * | 6/1995 | Watanabe | G01R 31/343 318/696 |
| 5,661,615 | A * | 8/1997 | Waugh | G11B 5/5534 360/75 |
| 6,219,196 | B1 * | 4/2001 | Semba | G11B 5/596 318/560 |
| 2003/0058558 | A1 * | 3/2003 | Ottesen | G11B 5/596 360/31 |
| 2004/0239279 | A1 | 12/2004 | Komiya et al. | |
| 2006/0290313 | A1 * | 12/2006 | Ment | G05B 19/351 318/638 |
| 2008/0246532 | A1 * | 10/2008 | Cosper | G05D 19/02 327/518 |

FOREIGN PATENT DOCUMENTS

| | | |
|---|---|---|
| CN | 202092766 U | 12/2011 |
| CN | 102589675 | 7/2012 |
| EP | 0 241 737 A2 | 10/1987 |
| JP | 2003 337092 A | 11/2003 |

OTHER PUBLICATIONS

Lin, Baoyang; On-Line Identification of Looseness Faults of Foundation Bedplate of Large-Scale Rotating Machinery, China Mechanical Engineering, 1994, vol. 5, No. 5, pp. 41-43, ISSN 1004-132X.

Ma, Hanyuan, Practice on Resonance Characteristics for Rotor System Determined by Bode Plot, Plant Maintenance Engineering, 1992, No. 3, pp. 22-24, ISSN1001-0599.

* cited by examiner

METHOD FOR MEASURING MECHANICAL RESONANCE FREQUENCY USING SERVO DRIVER

TECHNICAL FIELD OF THE INVENTION

The present invention relates to a technology of measuring/identification of mechanical resonance frequency. More specifically, the present invention relates to a method of measuring mechanical resonance frequency using a servo driver.

TECHNICAL BACKGROUND OF THE INVENTION

In the field of industrial automation such as electric drive and motor drive, mechanical resonance is common and the resonance frequency is generally about several hundred Hertz. Mechanical resonance may bring many disadvantages, for example, high on-site noise level, degradation of machining precision and mechanical precision, or shortened service life of the machines, etc. Therefore, it is required to remove the mechanical resonance as possible as we can when a machine is working, in particular, when high precision controls, such as a servo driver, are employed.

Generally, a servo driver comprises a resonance restraining controller therein and the resonance restraining controller would reduce the strength of the resonance frequency significantly if the resonance frequency is predetermined correctly. As such, the disadvantages of the mechanical resonance may be eased effectively. Therefore, it is essential to predetermine the correct mechanical resonance frequency. Generally, the mechanical resonance frequency is in a range of 100 Hertz to 1,000 Hertz, and if the precision of identification is less than 5 Hertz, it would satisfy the requirements of various applications.

In the prior art, a conventional method of identifying mechanical resonance frequency is implemented using an upper device. When a mechanical vibration is generated, the actual speed signal of the motor is collected by the upper device where the time domain signals are subjected to frequency analysis by Fast Fourier Transform (FFT) to obtain the amplitudes of each of the frequency points, and the frequency which corresponds to the greatest value of the amplitudes is the mechanical resonance frequency. However, this solution has the following problems: the frequency resolution of FFT is relative to the data size of the collected signal. If a higher resolution of frequency is required, the data size that needs to be collected would be greater. However, the amount of calculation of FFT will be increased by geometrical progression with respect to the collected data size. With the limitation of large amount of calculation, the upper device is generally a PC. In addition, other auxiliary devices are required, such as communication cables between the upper device and the servo driver, special servo communication software installed in the upper device, which complicate the overall device structure and increase the overall costs. Another problem is that the method of identifying mechanical resonance frequency as described above requires that the on-site operators are trained and have relevant skills, which, generally, can not be satisfied. Accordingly, it is rarely found that the on-site operators measure the mechanical resonance frequency using the upper device.

From the views of intelligent level and ease of use of a servo driver, if the function of resonance frequency identification is available to the servo driver per se, the mechanical components can be better driven, and the control performance of the servo driver can also be improved.

SUMMARY OF THE INVENTION

The technical problem to be solved by the present invention is to overcome the flaws of the prior art and provide a method of measuring mechanical resonance frequency using a servo driver which can implement an automatic measurement of the mechanical resonance frequency of a mechanical device.

The present invention is carried out by employing the technical solution as follows: having the servo driver work under a torque control mode, by applying in the servo driver a preset torque drive signal in a form of linear shift-register sequence (M sequence) which is a pseudo-random signal approximate to white noise, the motor drives the mechanical components in a microvibration state (in this way, the motor or the mechanical equipment would not be damaged); collecting synchronously actual speed signals of the motor and stored the same in a designated data area of SRAM in the servo driver until the application of the preset torque drive signal is completed, the motor being stopped, and the actual speed signal sequence of the motor being obtained; the actual speed signal sequence of the motor being passed in sequence through a certain number of band-pass filters having a fixed pass-band frequency but different center frequencies to obtain filtered speed signals; the speed signal sequence output from each of the band-pass filters being changed into absolute values and then accumulated to obtain an accumulation value of each of the speed signal sequence output from each of the band-pass filters; comparing the accumulation values obtained from the signal sequences output from the certain number of band-pass filters to determine the greatest accumulation value, and the center frequency of the band-pass filter corresponding to the largest accumulation value being the mechanical resonance frequency.

By applying a preset torque drive signal, the present invention can effectively protect the mechanical components inasmuch as the mechanical components are subjected to a minor motion. With the assistance of the high speed signal collecting and digital signal processing in the servo driver, the mechanical resonance frequency can be identified independently. The present invention can not only save the system cost, but also increase the intelligence and operability of the servo driver and thus can be widely used.

DETAILED DESCRIPTION OF THE INVENTION

Figure 1:
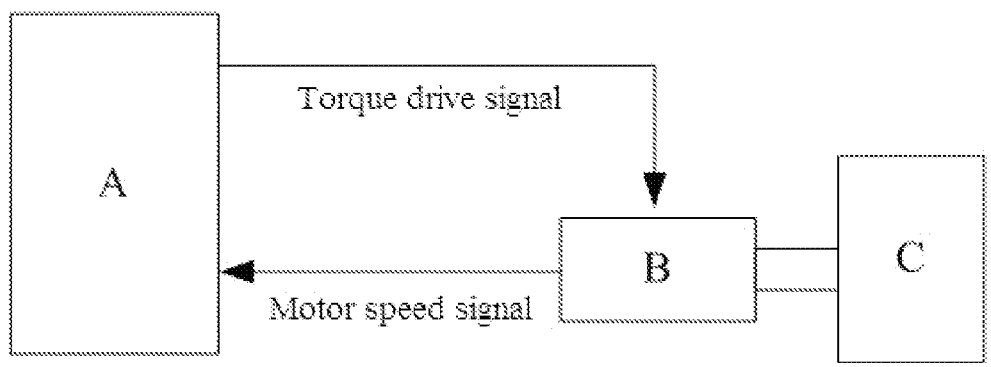
FIG. 1 is a block diagram of the equipments for implementing the method of measuring the mechanical resonance frequency of a mechanical device of the present invention, wherein A is a servo driver, B is a motor and C is a CNC milling machine.
Figure 2:
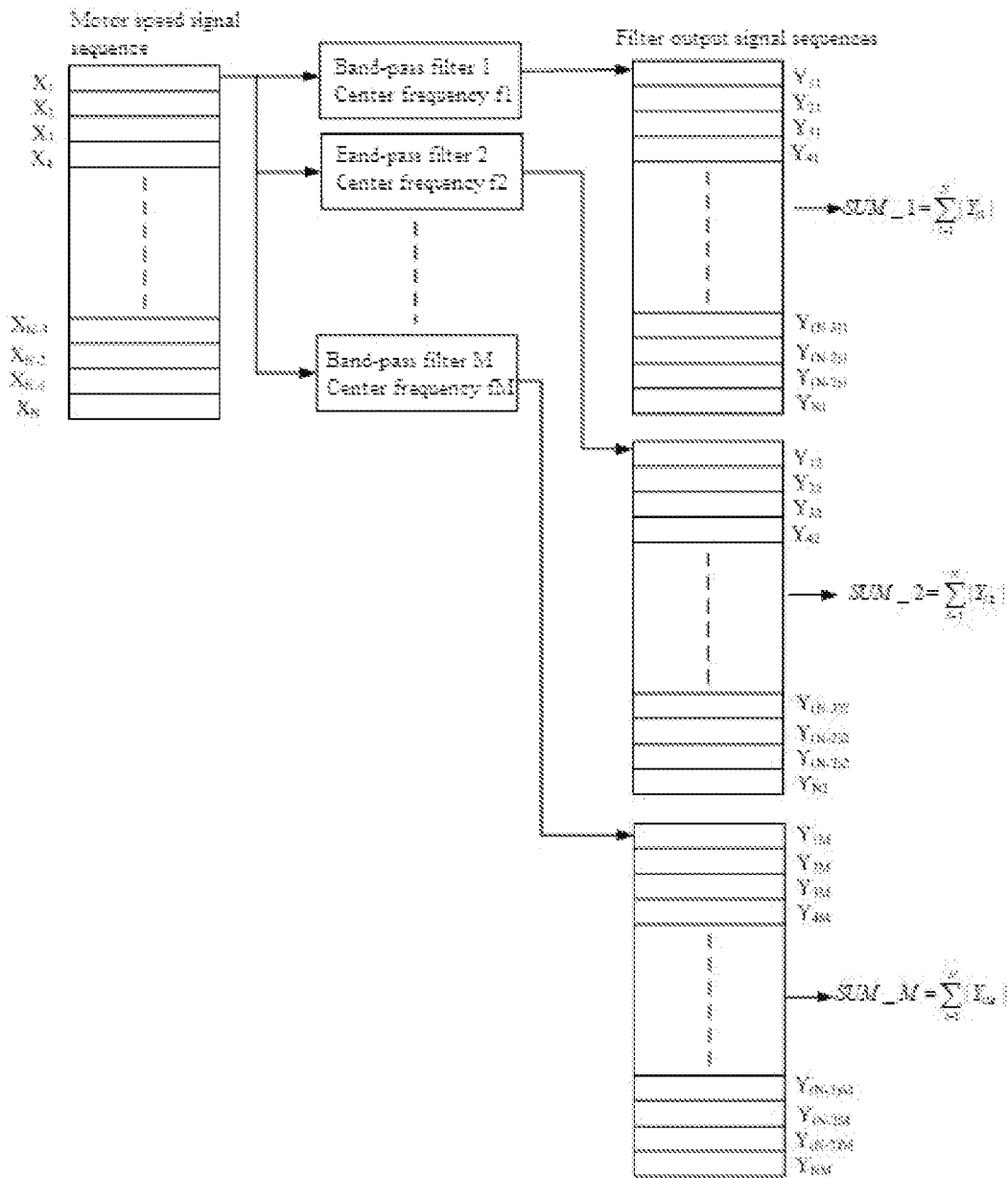
FIG. 2 is a block diagram of the data flow for resonance frequency analysis.

The present invention will be further described by referring to FIGS. 1-2 and the example.

Example

C shown in FIG. 1 was a CNC milling machine. An axis of the CNC milling machine was driven by the motor B using a ball screw, and the servo driver A was used to control the motor B. The number M of the selected band-pass filters was 10 and the center frequencies of each of the band-pass filters were respectively 100 Hz, 200 Hz, 300 Hz, . . . , 1000 Hz, and the pass-band frequency was 100 Hz.

As shown in FIG. 1, the servo driver A worked under a torque control mode. Based on the linear shift-register sequence (M sequence) preset in the servo driver A, a certain torque signal (torque drive signal) was generated. The amplitude of the torque drive signal was generally 5% to 10% of the nominal torque. The torque drive signal was applied to the motor B and then drove the CNC milling machine C such that the CNC milling machine was subjected to a minor motion, which would effectively protect the same. At the same time, the servo driver A collected the actual speed signal of the motor B to obtain a signal sequence of the actual speeds of the motor, and the signal sequence of the actual speeds of the motor was stored in a designated data area of the servo driver A and then was digital signal processed by the servo driver A to obtain the mechanical resonance frequency through analysis.

The digital signal processing and the mechanical resonance frequency analyzing comprised the steps of: as shown in FIG. 2, firstly, the speed signal sequence $X_1$-$X_N$ of the motor was passed through the band-pass filter 1, and a signal sequence $Y_{11}$-$Y_{N1}$ was output from the filter, and then the absolute values of the output signal sequence were subjected to an accumulation $$SUM\_1 = \sum_{i=1}^{N} |Y_{i1}|;$$

next, the speed signal sequence of the motor was passed through the band-pass filter 2, and a signal sequence $Y_{12}$-$Y_{N2}$ was output from the filter, and then the absolute values of the output signal sequence were subjected to an accumulation $$SUM\_2 = \sum_{i=1}^{N} |Y_{i2}|;$$

in the way similar to the above, the speed signal sequence of the motor was respectively passed through other band-pass filters until the same was finally passed through the band-pass filter M, and a signal sequence $Y_{1M}$-$Y_{NM}$ was output from the filter, and then the absolute values of the output signal sequence were similarly subjected to an accumulation $$SUM\_M = \sum_{i=1}^{N} |Y_{iM}|.$$

The values of SUM_1, SUM_2, . . . , SUM_M were compared and the center frequency $f_j$ of the band-pass filter j which corresponded to the greatest value SUM_j was approximated to the resonance frequency (when the center frequency of a band-pass filter is about the same with the resonance frequency, the completeness of the signal passing the band-pass filter will be the best, and accordingly, the SUM value will be the greatest), and the accuracy depends on the pass-band frequency of the pass-band filter (the wider the pass-band frequency, the lower the accuracy) and is determined according to the needs. In this example, the biggest value is SUM_5, and accordingly, the resonance frequency was approximated to the center frequency $f_5$ of the band-pass filter 5, which was 500 Hz with an identification precision of ±50 Hz, and this was a rough resonance frequency point.

Generally, a relatively bigger pass-band frequency may be initially set to identify a rough range of the resonance frequency. Subsequently, a smaller pass-band frequency will be set to identify a more accurate resonance frequency point. As such, the time required for the identification can be shortened and corresponding calculations can be reduced. After the first identification, this example further selected ten (M=10) band-pass filters, and the center frequencies of the band-pass filters were respectively 455 Hz, 465 Hz, 475 Hz, . . . , 545 Hz, and the pass-band frequency was 10 Hz. The steps for analyzing the mechanical resonance frequency shown in FIG. 2 were executed once again. Based on the calculations, the greatest value was SUM_8, and accordingly, the resonance frequency was approximated to the center frequency $f_8$ of the band-pass filter 8, which was 525 Hz with an identification precision of ±5 Hz. This can meet the requirements of high precision control circumstances, such as servo driver CNC milling machines.

Figure 3:
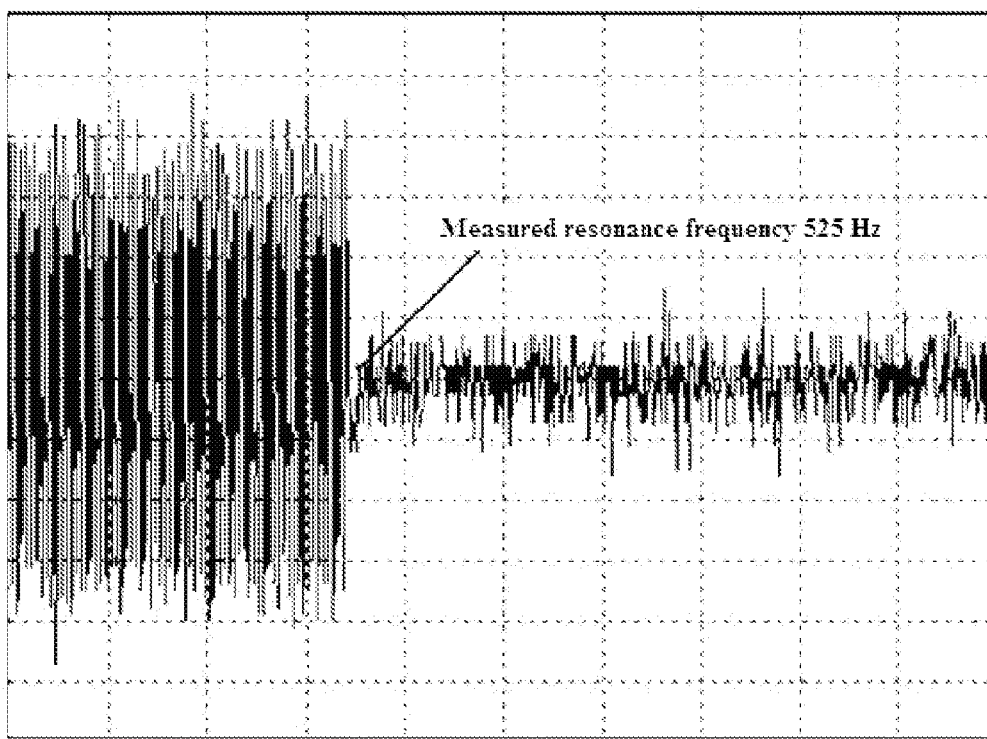
FIG. 3 is comparison chart showing the effects prior to the mechanical vibration attenuation and after the mechanical vibration attenuation.

After the mechanical resonance frequency was identified, the frequency is set into a resonance damping controller. The effects prior to the mechanical vibration attenuation and after the mechanical vibration attenuation were shown in FIG. 3. FIG. 3 was a reflection of the actual speed of the motor B. The servo driver A was used to control the motor B to drive the CNC milling machine C at a speed of 200 rpm. Due to the mechanical resonance, the speed fluctuation of the motor B was up to ±25 rpm. While after the vibration damping was performed, the speed fluctuation of the motor B was decreased to ±5 rpm. This example proves the accuracy of the mechanical frequency identified by the solution of the present invention and also the effectiveness thereof.

What is claimed is:
1. A method of measuring mechanical resonance frequency using a servo driver, comprising the steps of:
having the servo driver work under a torque control mode, by applying in the servo driver a preset torque drive signal in a form of linear shift-register sequence which is a pseudo-random signal approximate to white noise, the motor drives the mechanical components in a microvibration state;
collecting synchronously actual speed signals of the motor and storing the same in a designated data area of SRAM in the servo driver until the application of preset torque drive signal is completed, the motor being stopped, and the actual speed signal sequence of the motor being obtained;
passing the actual speed signal sequence of the motor in sequence through a certain number of band-pass filters having a fixed pass-band frequency but different center frequencies to obtain filtered speed signals; the speed signal sequence output from each of the band-pass filters being changed into absolute values and then accumulated to obtain an accumulation value of each of the speed signal sequence output from each of the band-pass filters; and
comparing the accumulation values obtained from the signal sequences output from the certain number of band-pass filters to determine the greatest accumulation value, and the center frequency of the band-pass filter which corresponds to the greatest accumulation value being the mechanical resonance frequency.

* * * * *